United States Patent
Thompson

(10) Patent No.: US 7,845,656 B2
(45) Date of Patent: Dec. 7, 2010

(54) DRYWALL CART

(75) Inventor: Keith J. Thompson, White River Junction, VT (US)

(73) Assignee: Thompson/McMahon Industries LLC, White River Junction, VT (US)

( * ) Notice: Subject to any disclaimer, the term of this patent is extended or adjusted under 35 U.S.C. 154(b) by 0 days.

(21) Appl. No.: 11/799,975

(22) Filed: May 3, 2007

(65) Prior Publication Data

US 2008/0272566 A1  Nov. 6, 2008

(51) Int. Cl.
*B62B 3/00* (2006.01)
(52) U.S. Cl. .................... 280/79.5; 280/47.35
(58) Field of Classification Search ............... 280/836, 280/33.991, 33.998, 651, 47.34, 79.11–79.7
See application file for complete search history.

(56) References Cited

U.S. PATENT DOCUMENTS

| | | | | | |
|---|---|---|---|---|---|
| 931,849 | A | * | 8/1909 | Dickinson | 248/129 |
| 2,531,131 | A | * | 11/1950 | Johnson | 248/129 |
| 3,834,725 | A | * | 9/1974 | Luoni | 280/79.2 |
| 4,861,050 | A | * | 8/1989 | Bergeron | 280/47.35 |
| 4,947,998 | A | * | 8/1990 | Smeller | 211/70.6 |
| 5,092,463 | A | * | 3/1992 | Dees | 206/373 |
| 5,183,280 | A | * | 2/1993 | Gresch | 280/79.5 |
| 5,211,294 | A | * | 5/1993 | Garman | 211/70.6 |
| 5,380,023 | A | * | 1/1995 | McBee | 280/87.01 |
| 5,380,033 | A | * | 1/1995 | Harling | 280/654 |
| 5,390,944 | A | * | 2/1995 | Sherwin | 280/47.35 |
| 5,704,496 | A | * | 1/1998 | Latta | 211/70.6 |
| D393,131 | S | * | 3/1998 | Scandalis | D34/24 |
| 5,806,867 | A | * | 9/1998 | Hampton | 280/47.34 |
| 5,833,095 | A | * | 11/1998 | Russell et al. | 224/576 |
| 5,881,891 | A | * | 3/1999 | Murphy, Jr. | 211/70.6 |
| 5,971,333 | A | * | 10/1999 | Fiedor | 248/129 |
| 6,027,128 | A | * | 2/2000 | Stich et al. | 280/47.16 |
| 6,135,467 | A | * | 10/2000 | Tagariello | 280/79.5 |
| 6,176,500 | B1 | * | 1/2001 | Clement et al. | 280/79.5 |
| 6,179,306 | B1 | * | 1/2001 | Maxwell | 280/47.26 |
| RE37,350 | E | * | 9/2001 | Stephan | 280/79.5 |
| 6,315,310 | B1 | * | 11/2001 | Hurt | 280/79.5 |
| 6,419,246 | B1 | * | 7/2002 | Neal | 280/79.5 |
| D468,509 | S | * | 1/2003 | Figueroa | D34/12 |
| 6,698,771 | B1 | * | 3/2004 | Bergeron | 280/47.35 |
| 6,715,627 | B1 | * | 4/2004 | Bonner et al. | 220/4.27 |
| 6,729,631 | B2 | * | 5/2004 | Trine et al. | 280/79.5 |
| 6,823,998 | B2 | * | 11/2004 | Fabregas | 211/70.6 |
| 6,827,357 | B2 | * | 12/2004 | Calmeise et al. | 280/47.34 |
| 6,851,566 | B1 | * | 2/2005 | Bonner | 220/4.27 |
| 6,851,686 | B2 | * | 2/2005 | Figueroa | 280/79.5 |
| 6,883,268 | B2 | * | 4/2005 | Fraser | 43/54.1 |
| D508,596 | S | * | 8/2005 | Chochinov et al. | D34/10 |
| 6,935,644 | B1 | * | 8/2005 | Oranday | 280/47.34 |
| 7,073,205 | B2 | * | 7/2006 | Finn | 2/160 |

(Continued)

*Primary Examiner*—J. Allen Shriver, II
*Assistant Examiner*—Jacob Meyer
(74) *Attorney, Agent, or Firm*—Downs Rachlin Martin PLLC

(57) ABSTRACT

A drywall bucket and tool carrying cart has a main body with an interior space and open top to receive and retain a drywall compound bucket and five legs extending downwardly and outwardly from the perimeter of the body of the cart. Lockable rollers extend from the bottoms of the legs. A shelf attaches to the legs below the body of the cart. A slotted rim for tools with at least one handle surrounds the upper perimeter of the cart.

16 Claims, 2 Drawing Sheets

U.S. PATENT DOCUMENTS

| | | | |
|---|---|---|---|
| 7,213,817 B2 * | 5/2007 | Cheung ........................ | 280/42 |
| 7,240,910 B2 * | 7/2007 | Stuemke .................... | 280/79.5 |
| D573,323 S * | 7/2008 | Vargas ......................... | D34/18 |
| 7,427,076 B2 * | 9/2008 | Gwin ......................... | 280/79.2 |
| 7,431,313 B1 * | 10/2008 | Torres et al. ............. | 280/47.26 |
| 7,434,819 B1 * | 10/2008 | Dunavin .................. | 280/47.35 |
| 7,584,973 B2 * | 9/2009 | Brager .................... | 280/47.35 |
| 7,594,353 B2 * | 9/2009 | Lucky ........................ | 43/21.2 |
| 7,597,392 B1 * | 10/2009 | Gilmore ..................... | 297/217.1 |
| 2003/0052465 A1 * | 3/2003 | Ahmed et al. ............. | 280/79.5 |
| 2003/0102644 A1 * | 6/2003 | Figueroa ................... | 280/47.35 |
| 2003/0213090 A1 * | 11/2003 | Holsten et al. ................ | 15/323 |
| 2003/0227148 A1 * | 12/2003 | Shipman et al. .......... | 280/47.34 |
| 2004/0245735 A1 * | 12/2004 | Pins .......................... | 280/79.5 |
| 2005/0077695 A1 * | 4/2005 | Sherer et al. ............... | 280/79.5 |
| 2006/0144732 A1 * | 7/2006 | Kaplan et al. ............... | 206/349 |
| 2006/0157946 A1 * | 7/2006 | Stuemke .................... | 280/79.5 |
| 2006/0214384 A1 * | 9/2006 | Gwin ........................ | 280/79.5 |
| 2007/0290471 A1 * | 12/2007 | Sexton ...................... | 280/79.5 |
| 2009/0302563 A1 * | 12/2009 | Thibault .................. | 280/47.34 |

* cited by examiner

DRYWALL CART

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to carts and particularly to a wheeled drywall cart comprising a body which is supported by four telescoping legs having a perforated shelf mounted therebetween, the body having a bucket supporting opening in the top and one or more tool holding brackets mounted on the sides thereof, said legs are telescopically adjustable thereby allowing a worker access to the bucket without reaching down or getting off scaffolds or elevated stilts.

2. Description of Related Art including Information Disclosed Under 37 CFR 1.97 and 1.98

Drywall construction crews use gypsum wallboard to construct walls and ceilings. Drywall panels are affixed to studs and then the joints between panels are filled and coated with a joint compound mixture prepared onsite by mixing a pre-mixed joint compound (or "mud") with water. After the joint compound mixture is applied it dries and hardens. Workers then sand it to produce a smooth joint surface.

Prior art devices for transporting and using drywall buckets filled with joint compound and drywall tools do not provide a stable wheeled base support with multi-directional wheeled travel for transport and locking rollers for work situations with easy to access tool storage.

Two U.S. Patent Applications #20050051682 published Mar. 10, 2005 and #20040011930 published Jan. 22, 2004 by Tuohy, show a bucket support device comprising: a stand; a vertically disposed central telescoping rod, the rod comprising a first end attached to the stand, and a second end; a horizontally stable horizontally disposed flat support platform, the support platform comprising a bottom surface stably attached to second end of the rod, and a top surface wherein the support platform does not pivot in the horizontal plane; a bucket comprising a horizontal base and vertical side walls, the vertical side walls having a top end opposite the horizontal base, forming a lip at the circumference of the bucket, defining the inside from the outside of the bucket, and the bucket horizontal base stably attached to the top surface of the support platform by a bucket attachment means; and a bucket attachment means, wherein the means stably extends to the support platform and the bucket.

U.S. Patent Application #20050077695, published Apr. 14, 2005 by Sherer, claims a container with brackets secured thereto, for supporting adjustable legs for pivotal movement between a retracted position and an extended position in which they support the container. The container, especially a five gallon bucket, is provided with a plurality of brackets for supporting at least three legs for pivotal movement between a first, retracted position and a second, extended position, with a lock for locking the legs in the extended position. Preferably, the legs comprise telescoping members with locks for locking the members in a variety of relative positions. The brackets, in one embodiment, have a container sidewall flange, which is positioned against a sidewall of the container, at least one container bottom flange, which is positioned against a bottom of the container, and two leg support flanges, which extend outwardly from the container sidewall flanges and a container. In another embodiment, the brackets have two leg support flanges which extend outwardly from the container and have locking slots in which locking pins which extend through the legs which can be seated to lock the legs in either the retracted position or the extended position.

U.S. Pat. No. 6,776,379, issued Aug. 17, 2004 to Sherer, is for a container with brackets secured thereto, for supporting adjustable legs for pivotal movement between a retracted position and an extended position in which they support the container. The container, especially a five gallon bucket, is provided with a plurality of brackets for supporting at least three legs for pivotal movement between a first, retracted position and a second, extended position, with a lock for locking the legs in the extended position. Preferably, the legs comprise telescoping members with locks for locking the members in a variety of relative positions. The brackets, in one embodiment, have a container sidewall flange, which is positioned against a sidewall of the container, at least one container bottom flange, which is positioned against a bottom of the container, and two leg support flanges, which extend outwardly from the container sidewall flanges and a container. In another embodiment, the brackets have two leg support flanges which extend outwardly from the container and have locking slots in which locking pins which extend through the legs which can be seated to lock the legs in either the retracted position or the extended position.

U.S. Pat. No. 6,893,032, issued May 17, 2005 to Kershaw, provides a caster supported mobile tray comprising a multi-purpose wheeled carrier that includes various surfaces, recesses and unique features for providing alternative methods of containing, sorting and transporting random materials of various sizes, bulk and weight. The base of the carrier has a shallow upstanding circular wall large enough to accept a container of the 5 gallon size and a multiple of smaller containers, the base has other provisions for the reception of smaller parts and or tools. Recesses at other levels similarly have recesses again for accepting smaller items. Holes and slots provided at various heights allow for bulkier items to be fastened to the carrier by way of fasteners.

U.S. Pat. No. 6,361,001, issued Mar. 26, 2002 to Durand, shows a container holder for mixing slurry material in a 2½ or 5 gallon bucket. The container holder is formed from a one-piece raised top portion having a centrally disposed aperture allowing insertion of a stirring paddle. Depending from the top portion are two adjustable legs that extend downwardly and span the entire height of the bucket to be mixed with foot pads joined at the bottom of the legs extending outwardly therefrom which allow an individual to stand on during the mixing operation.

U.S. Pat. No. 4,861,050, issued Aug. 29, 1989 to Bergeron, claims a craftsman's valet which has a wheeled supporting base, a pedestal which is mounted on the supporting base for supporting a bucket. The valet is also provided with storage compartments, a removable seat and a light fixture.

U.S. Pat. No. D343,938, issued Feb. 1, 1994 to Liverman, describes the ornamental design for a portable wheeled car wash cart, which holds a bucket and has shelves for organizing car washing equipment.

U.S. Pat. No. 931,849, issued Aug. 24, 1909 to Dickinson, indicates a portable truck for a tub which comprises a tub-supporting ring that is elevated by wheeled legs.

U.S. Pat. No. 6,176,500, issued Jan. 23, 2001 to Clement, Jr., shows a transportable caddy for use in storing a number of products commonly used in washing a vehicle. The caddy includes a circular support which is adapted to removably and securely support a bucket. The entire caddy is supported by four legs. Each leg has a roller upon its lower extent, the roller allowing the entire caddy to be easily transported. Furthermore, the legs support drawers which allow for the storage of various cleaning products.

What is needed is a drywall cart having a stable wheeled base support with multi-directional wheeled travel for transport and locking rollers for work situations with easy to access tool storage for transporting and using drywall buckets filled with joint compound and drywall tools.

BRIEF SUMMARY OF THE INVENTION

An object of the present invention is to provide a drywall cart having a stable wheeled base support with multi-directional wheeled travel for transport and locking rollers for work situations with easy to access tool storage for transporting and using drywall buckets filled with joint compound and drywall tools.

A related object of the present invention is to provide a drywall bucket and tool carrying cart with five legs that extent outwardly from the body of the cart to provide stability and prevent tipping of the cart.

Another related object of the present invention is to provide a drywall bucket and tool carrying cart that has swivel rollers at the bottom of the legs, and at least one handle on the body of the cart to allow easy one-handed maneuverability of the cart.

An additional object of the present invention is to provide a drywall bucket and tool carrying cart device with at least one handle to allow easy transport and lifting of the cart.

Yet another advantage of the present invention is that it provides a drywall bucket and tool carrying cart device that allows easy insertion and removable of a bucket of drywall compound.

One more object of the present invention is to provide a drywall bucket and tool carrying cart that has a rim around the main body with slots to hold drywall tools and supplies, keeping them easily accessible during a job.

An additional object of the present invention is to provide a drywall bucket and tool carrying cart that has a shelf under the main body of the cart to hold additional drywall tools and supplies.

A further object of the present invention is to provide a drywall bucket and tool carrying cart that is constructed of a lightweight, sturdy material for enhanced portability.

A contributory object of the present invention is to provide a drywall bucket and tool carrying cart that has a smooth surface for easy cleanup.

In brief, a drywall bucket and tool carrying cart is constructed of a lightweight, sturdy material with a smooth, shiny surface has five legs protruding downwardly and outwardly from the perimeter of the body of the cart, with lockable rollers on the bottoms of the legs. The legs may be telescoping legs to adjust the height of the cart. A slotted rim for holding tools and having at least one protruding handle extends outwardly around the top edge of the body of the cart. A shelf attached to the legs under the main body of the cart holds tools and supplies. The cart is preferably fabricated of a molded synthetic material to provide a lightweight, sturdy, stable, easily cleanable cart that can be maneuvered with one hand and that holds all the tools and supplies needed for a drywall job (and may be height-adjustable).

An advantage of the present invention is that it is lightweight.

Another advantage of the present invention is that it is stable.

One more advantage of the present invention is that it is easy to transport.

Yet another advantage of the present invention is that it is easy to maneuver.

An additional advantage of the present invention is that it is height-adjustable.

A further advantage of the present invention is that it allows all the tools and supplies for drywall application to be contained and transported in a single cart.

Another advantage of the present invention is that is allows a the drywall compound and tools and other supplies to be easily inserted and removed from the device.

A contributory advantage of the present invention is that it is easy to clean.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
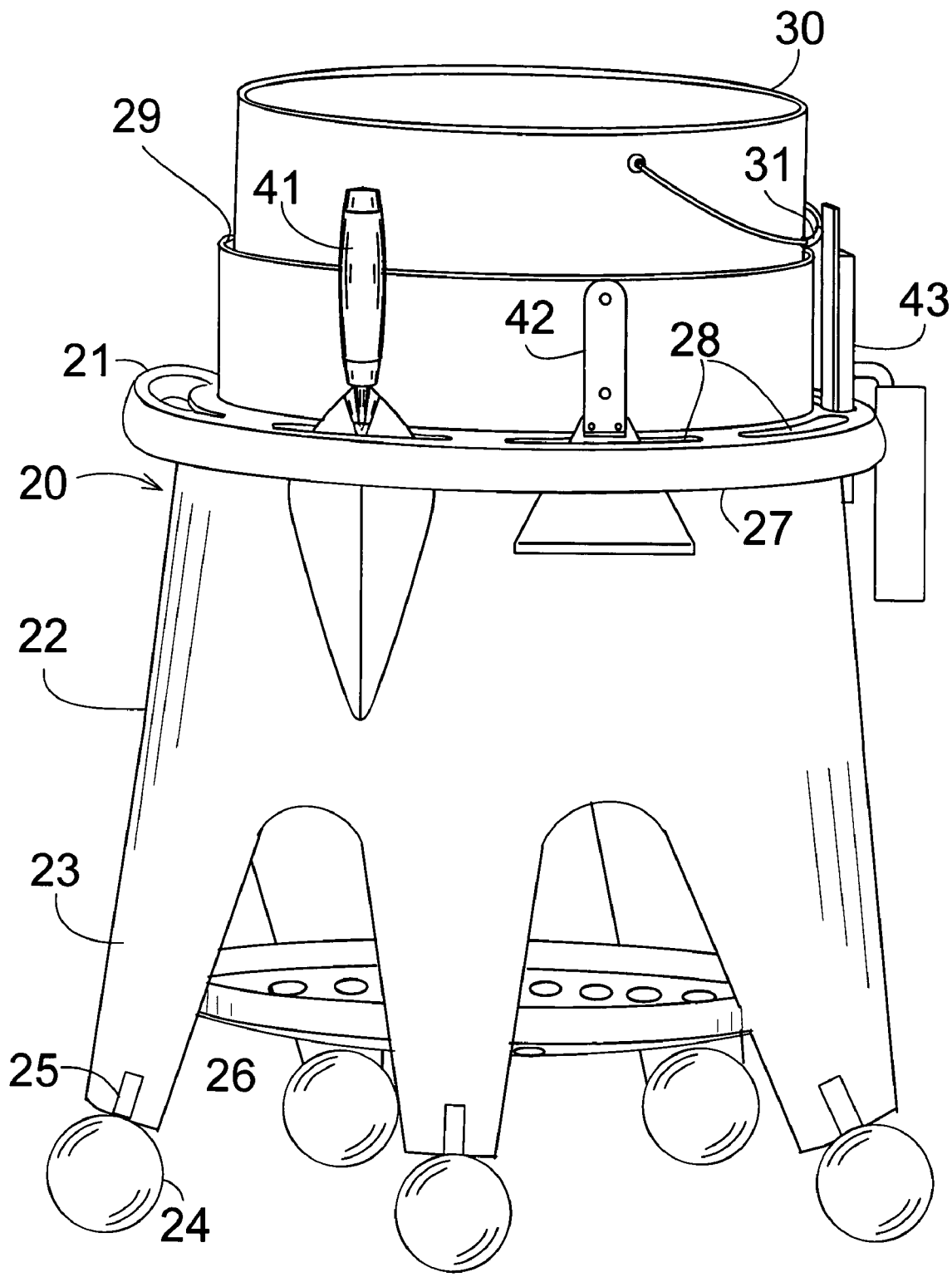
FIG. 1 is a perspective view of the drywall cart of the present invention showing a drywall bucket and drywall tools stored thereon.
Figure 2:
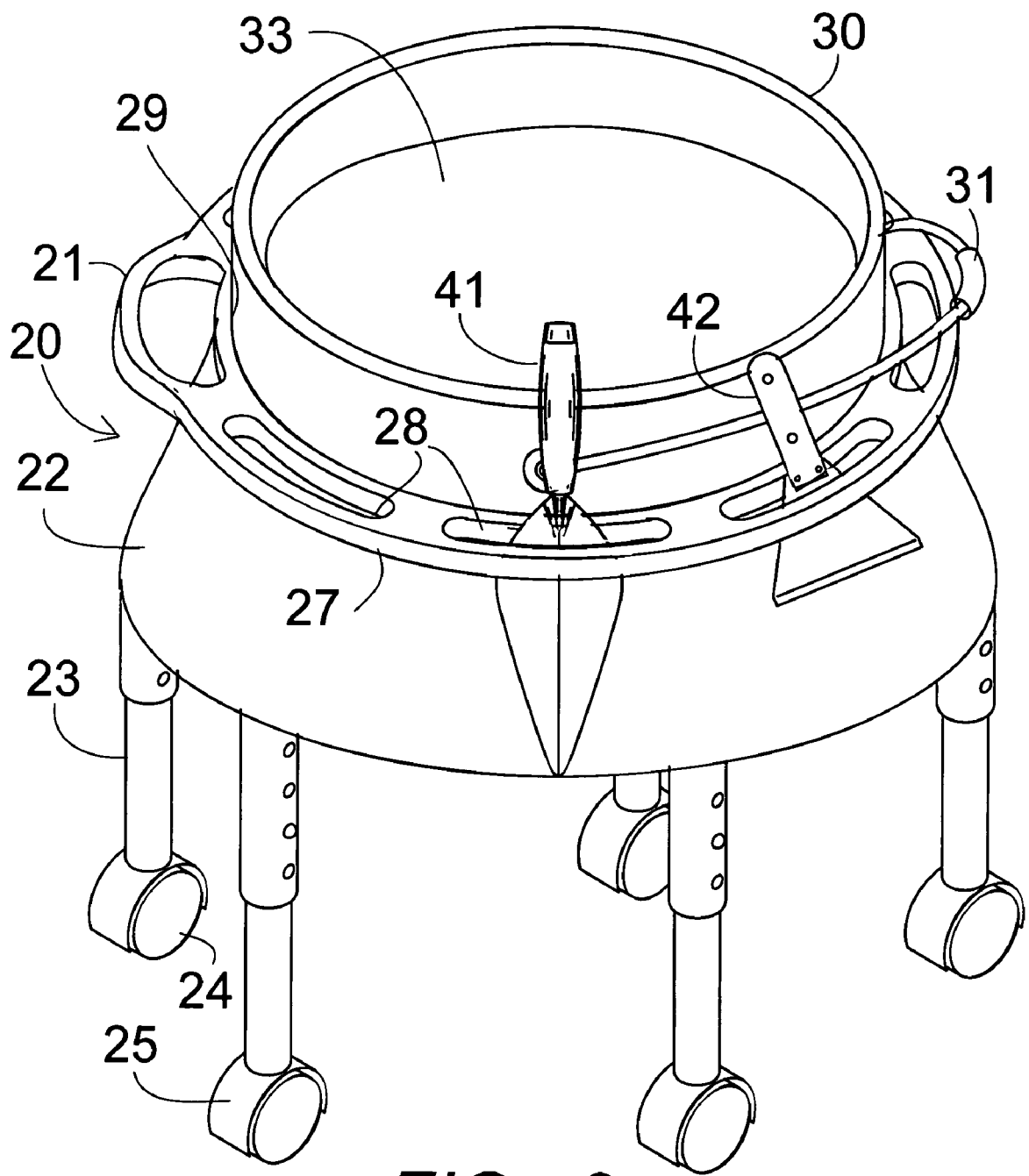
FIG. 2 is a perspective view of the drywall cart of the present invention having telescoping adjustable height legs.

In FIGS. 1 and 2, a drywall bucket and tool carrying cart device 20 comprises a drywall cart, the main body 22 of which has an interior bucket carrying space with a top opening 29 that removably admits and retains a drywall bucket 30 with a handle 31 therein, allowing access to drywall joint compound 33 through a top opening in the drywall bucket.

The drywall bucket and tool carrying cart device 20 further comprises an external ridge 21 around the main body 22 having a series of slotted openings 28 therein that receive and retain a variety of drywall tools 41, 42, and 43 removably therein, a handle 21 protruding from at least one side of the main body 22 for maneuvering and lifting the drywall cart, a series of legs 23 extending downwardly and outwardly from the main body 22 so that the bottoms of the legs are positioned beyond an outer perimeter of the main body to prevent tipping of the main body, a roller 24, preferably a swivel roller, attached to a bottom of each of the legs 23 for transporting the drywall cart, and locking means 25 for locking at least two of the rollers, and preferably all of the rollers, to secure the drywall cart in a stable position for using the drywall cart on a job.

The drywall bucket and tool carrying cart device 20 also has a storage shelf 26 secured to the legs 23 below the main body 22 of the drywall cart for storing items thereon.

In a preferred embodiment, the drywall bucket and tool carrying cart device 20 has five legs 23 for stability to prevent tipping.

In FIG. 2 the drywall bucket and tool carrying cart device 20 may have legs 23 that are adjustable in height for working with the drywall cart at different heights. In one embodiment, each of the legs 23 has a telescoping mechanism, such as a peg in one of multiple holes between two telescoping sections, for adjusting the height of the leg.

The rollers 24 on the legs 23 of the drywall bucket and tool carrying cart device 20 device preferably comprise swivel rollers for maneuverability of the drywall cart.

The drywall bucket and tool carrying cart device 20 has a smooth shiny surface for easy cleaning, and is preferably fabricated by molding a lightweight sturdy synthetic material, or, in an alternate embodiment, the drywall bucket and tool carrying cart device is fabricated of stainless steel for durability and easy cleaning.

It is understood that the preceding description is given merely by way of illustration and not in limitation of the invention and that various modifications may be made thereto without departing from the spirit of the invention as claimed.

SEQUENCE LISTING

Not Applicable.

What is claimed is:

1. A drywall bucket and tool carrying cart device, comprising:
   a main body defining an internal drywall bucket carrying space configured and dimensioned to receive and removably retain a drywall bucket, the main body having an upper edge defining an opening that is dimensioned to closely receive the drywall bucket at a point on the bucket below a handle attachment and above a vertical mid-point of the bucket;
   a tool carrying ridge extending around the main body at a position spaced downwardly from the main body upper edge to define an upper wall portion between said ridge and upper edge, said ridge having a series of slotted openings therein to receive and retain a variety of drywall tools removably therein;
   a series of legs disposed below the tool carrying ridge, the legs having an upper end below said ridge, the upper end having an outer diameter greater than the upper wall portion, the legs extending downwardly and outwardly from the main body so that the bottoms of the legs are positioned beyond an outer perimeter of the main body to prevent tipping of the main body; and
   rollers disposed at the lower ends of the legs.

2. The device of claim 1 further comprising a storage shelf secured to the legs below the main body of the drywall cart for storing items thereon.

3. The device of claim 1 wherein the drywall cart comprises five legs for stability to prevent tipping.

4. The device of claim 1 wherein the rollers comprise swivel rollers for maneuverability of the drywall cart.

5. The device of claim 1 wherein the drywall cart is fabricated by molding a lightweight sturdy synthetic material.

6. The device of claim 1 wherein the drywall cart has a smooth shiny surface for easy cleaning of drywall compound from the surface.

7. The device of claim 1 wherein the drywall cart is fabricated of stainless steel for durability and easy cleaning.

8. The device of claim 1, wherein the height of the upper wall portion is about the same as the distance a drywall bucket extends above the upper edge when received in the main body.

9. The device of claim 1, further comprising a handle formed in the tool carrying ridge.

10. The device of claim 1, wherein the internal drywall bucket carrying space is configured to position an upper edge of the bucket received in said space above a handle of a drywall trowel received in said tool carrying ridge.

11. A drywall bucket and tool carrying cart device, comprising:
    a main body defining an internal drywall bucket carrying space configured and dimensioned to closely receive and removably retain a drywall bucket, the main body having an upper edge defining an opening that is dimensioned to closely receive the drywall bucket at a point on the bucket below a handle attachment and above a vertical mid-point of the bucket;
    a tool carrying ridge defining elongated slots configured to receive drywall tools including drywall trowels extending around the main body at a position spaced downwardly from the main body upper edge to define an upper wall portion between said ridge and upper edge having a height approximately equal to the distance a drywall bucket extends above the upper edge when received in the main body such that the upper edge of a drywall bucket received in the bucket carrying space is positioned above a handle of a drywall trowel received in said tool carrying ridge;
    an outward flaring body portion disposed below the tool carrying ridge, wherein the outward flaring body portion has an upper end disposed below the tool carrying ridge and said upper end has an outer diameter greater than the upper wall portion such that the tool carrying ridge is disposed at least in part on said upper end;
    plural legs extending downwardly from the outward flaring body portion; and
    rollers disposed at the lower ends of the legs.

12. The device of claim 11 wherein each of the legs is adjustable in height for working with the drywall cart at different heights.

13. The device of claim 12 wherein each of the legs comprises a telescoping leg for adjusting the height of the leg.

14. The device of claim 11, wherein the main body, tool carrying ridge, outward flaring body portion and plural legs are made from a material with a smooth, shiny surface to facilitate cleaning of drywall compound therefrom.

15. The device of claim 14, further comprising a handle formed in the tool carrying ridge.

16. The device of claim 11, further comprising in combination a drywall bucket closely received in said bucket carrying space and a drywall trowel with a handle received in said tool carrying ridge, wherein said bucket extends above the drywall trowel handle.

* * * * *